(12) United States Patent
Jeong et al.

(10) Patent No.: US 10,229,072 B2
(45) Date of Patent: Mar. 12, 2019

(54) SYSTEM AND METHOD FOR DESPREADER MEMORY MANAGEMENT

(71) Applicant: Avago Technologies International Sales Pte. Limited, Singapore (SG)

(72) Inventors: Ku Hong Jeong, San Jose, CA (US); Qi Zuo, Milpitas, CA (US); Shaohua Yang, San Jose, CA (US); Kaitlyn T. Nguyen, San Jose, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 788 days.

(21) Appl. No.: 14/230,908

(22) Filed: Mar. 31, 2014

(65) Prior Publication Data

US 2015/0269097 A1 Sep. 24, 2015

Related U.S. Application Data

(60) Provisional application No. 61/955,422, filed on Mar. 19, 2014.

(51) Int. Cl.
*G06F 13/16* (2006.01)
*G06F 5/12* (2006.01)
*G06F 5/14* (2006.01)
*H04L 12/861* (2013.01)

(52) U.S. Cl.
CPC ............ *G06F 13/1673* (2013.01); *G06F 5/12* (2013.01); *G06F 5/14* (2013.01); *H04L 49/9005* (2013.01); *H04L 49/9031* (2013.01); *H04L 49/9036* (2013.01)

(58) Field of Classification Search
CPC .......... G06F 5/12; G06F 5/14; G06F 13/1673; H04L 49/9005
See application file for complete search history.

(56) References Cited

U.S. PATENT DOCUMENTS

| | | | |
|---|---|---|---|
| 6,351,780 B1* | 2/2002 | Ecclesine | 710/22 |
| 8,402,348 B1* | 3/2013 | Gunnam et al. | 714/773 |
| 2008/0005405 A1* | 1/2008 | Innis et al. | 710/56 |
| 2014/0071558 A1* | 3/2014 | Lu et al. | 360/49 |

* cited by examiner

*Primary Examiner* — Ann J Lo
*Assistant Examiner* — Masud K Khan
(74) *Attorney, Agent, or Firm* — Sheridan Ross P.C.

(57) ABSTRACT

The disclosure is directed to a system and method of managing memory resources in a communication channel. According to various embodiments, incoming memory slices associated with a plurality of data sectors are de-interleaved and transferred sequentially through a buffer to a decoder for further processing. To prevent buffer overflow or degraded decoder performance, the memory availability of the buffer is monitored, and transfers are suspended when the memory availability of the buffer is below a threshold buffer availability.

20 Claims, 10 Drawing Sheets

SYSTEM AND METHOD FOR DESPREADER MEMORY MANAGEMENT

PRIORITY

The present application claims priority under 35 U.S.C. § 119(e) to U.S. Provisional Patent Application Ser. No. 61/955,422, titled SYSTEM AND METHOD FOR ELASTIC DESPREADER MEMORY MANAGEMENT, By Ku Hong Jeong et al., filed Mar. 19, 2014, or is an application of which currently application(s) are entitled to the benefit of the filing date. The above-referenced provisional patent application is hereby incorporated by reference in its entirety.

FIELD OF INVENTION

The disclosure relates to the field of communication channels and more particularly to management of memory resources in a communication channel.

BACKGROUND

By interleaving data sectors around a track it is possible average out sector-to-sector signal-to-noise ratio (SNR) variation, such that bad SNR (e.g. due to a media defect) can be spread around into multiple data sectors. This lessens the impact on each individual sector and improves overall SNR variation tolerance for a data storage device, such as a hard disk drive (HDD). However, input and output timings can vary when memory slices are de-interleaved to reconstruct the data sectors. When a despreader outputs the de-interleaved data sectors through a buffer (e.g. Y-buffer) in sequence for decoding, the buffer may overflow if the despreader outputs the de-interleaved data sectors too quickly, or decoder performance may be degraded as data sectors are forced through an abbreviated decoding cycle in order to prevent buffer overflow.

SUMMARY

The disclosure is directed to a system and method for managing despreader and buffer memory blocks in order to prevent or reduce overflow instances and preserve decoder performance. According to various embodiments of the disclosure, a communication channel includes a despreader memory block configured to de-interleave incoming memory slices associated with a plurality of data sectors and a buffer configured to receive the de-interleaved memory slices from the despreader memory block. The buffer is then configured to transfer the de-interleaved memory slices of the plurality of data sectors sequentially to a decoder for further processing. The communication channel further includes a resource management controller configured to monitor a memory availability of the despreader memory block and a memory availability of the buffer. To prevent buffer overflow, the resource management controller is configured to suspend the transfer of the de-interleaved memory slices of a data sector from the despreader memory block to the buffer when the memory availability of the buffer is below a threshold buffer availability. Accordingly, the data sector is held in the despreader memory block until the buffer has memory available to accommodate the transfer.

In some embodiments, to prevent despreader overflow, the resource management controller will not suspend the transfer if the memory availability of the despreader memory block is below the threshold despreader availability, regardless of the memory availability of the buffer. In such instances, the resource management controller may be configured to allow transfer of the de-interleaved data to the buffer even though a data sector being processed by the decoder may be forced to undergo an abbreviated decoding cycle as a result. This priority scheme allows the despreader and buffer memory blocks to act as a combined buffer, where both of their memory resources are advantageously utilized to reduce the likelihood of buffer overflow or degraded decoder performance.

It is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like characters.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings. Various embodiments of a system and method for managing memory resources and throughput within a communication channel are illustrated in FIGS. 1A through 7B. Some communication channels include a despreader (sometimes referred to as a "de-interleaver") memory block configured to de-interleave incoming data and output the de-interleaved data to a buffer, such as a Y-buffer. When the despreader outputs data too quickly, the buffer may overflow or force sectors through an abbreviated decoding cycle. Various embodiments of the disclosure are directed to systems or methods for managing data flow between despreader and Y-buffer memory blocks in order to prevent or reduce overflow instances and preserve decoder performance.

Figure 1A:
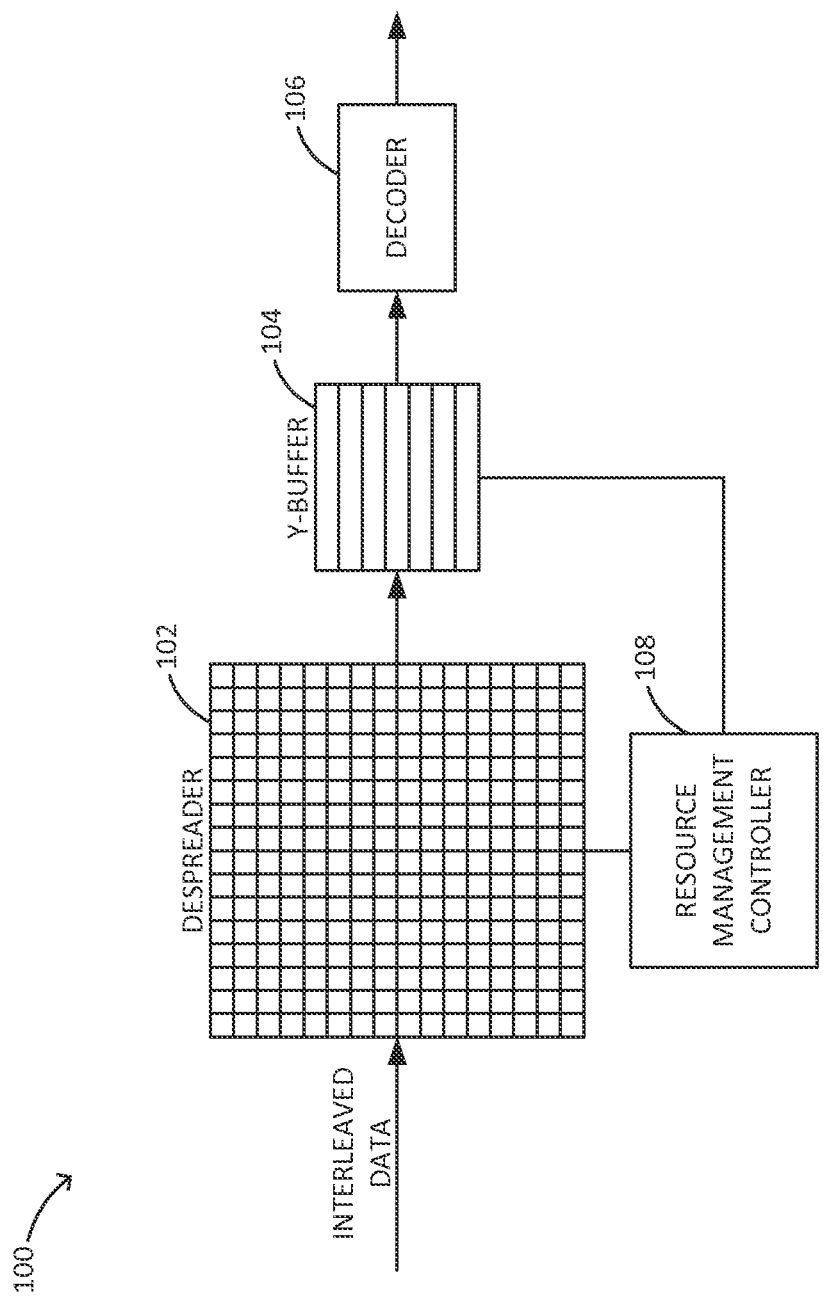
FIG. 1A is a block diagram illustrating a communication channel including a resource management controller for managing memory resources of a despreader memory block and a Y-buffer, in accordance with an embodiment of the disclosure.

FIG. 1A illustrates a communication channel 100 according to an embodiment of the disclosure. The communication channel 100 includes a despreader memory block 102 configured to de-interleave incoming memory slices associated with a plurality of data sectors. That is, the memory slices of multiple data sectors are rearranged or interleaved before being transferred to the despreader 102 via a spreader (sometimes referred to as an "interleaver") memory block. For example, the data sectors may be interleaved for more efficient retrieval or to improve SNR tolerance. The despreader 102 may be configured to receive the interleaved memory slices from a hard disk drive (HDD) platter or any other transmission or storage medium. After de-interleaving the memory slices, the despreader 102 is further configured to output the de-interleaved memory slices of each sector, sequentially, to a buffer 104. The buffer 104 is configured to temporarily store each of the received (de-interleaved) data sectors until a decoder 106, such as a low-density parity check (LDCP) decoder, is ready to receive the data sector (i.e. when the decoder 106 is finished processing a previously transferred sector).

The communication channel 100 further includes a resource management controller 108 that is communicatively coupled with the despreader memory block 102 and the buffer 104. As discussed above, the buffer 104 may overflow or force out a data sector if the despreader 102 continues to output de-interleaved data when the buffer memory is fully or substantially occupied. Meanwhile, the despreader memory block 102 can have a higher storage capacity than the buffer 104. In some embodiments, for example, the despreader memory is configured to store 16 4 KB sectors, while the buffer memory configured to store 7 4 KB sectors. To prevent overflow or degraded decoding performance, the resource management controller 108 is configured to monitor the despreader and buffer memories and to manage the despreader output accordingly.

Figure 1B:
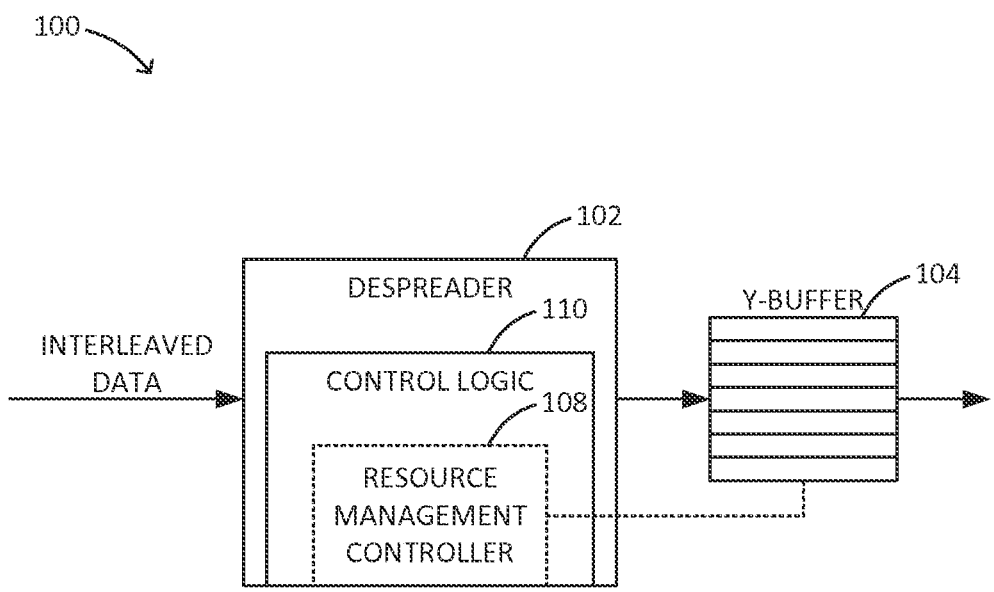
FIG. 1B is a block diagram illustrating the communication channel, wherein the despreader memory block includes the resource management controller, in accordance with an embodiment of the disclosure.

In some embodiments, as shown in FIG. 1B, the resource management controller 108 is at least partially included in control logic 110 of the despreader memory block 102. In some embodiments, the resource management controller 108 is separate from the despreader memory block 102, as illustrated in FIG. 1A, or the resource management controller 108 may additionally/alternatively be at least partially included in buffer control logic. The resource management controller 108 effectively bridges the despreader 102 and the buffer 104 either purely via communicative coupling or via one or more shared resources. The resource management controller 108 may include any combination of hardware, firmware, or software for accomplishing the functions, operations, or steps described herein. In some embodiments, the resource management controller 108 includes one or more of the following: electronic circuitry, a programmable logic device, an application-specific integrated circuit (ASIC), a microcontroller, or a computing system.

As further described below with regard to method 500 or method 600, the resource management controller 108 is configured to monitor the memory availability or amount of unoccupied memory in the despreader and buffer memory blocks. The resource management controller 108 is further configured to suspend data transfers from the despreader 102 to the buffer 104 when the memory availability of the buffer 104 falls below a pre-determined or user-specified threshold buffer availability. When data transfers are suspended, de-interleaved sectors are temporarily stored by the despreader memory block 102 until the buffer 104 is no longer in violation of the threshold buffer availability. To prevent overflow of the despreader memory block 102, the resource management controller 108 is further configured to resume data transfers or avoid suspension of data transfers when the memory availability of the despreader 102 falls below a pre-determined or user-specified threshold despreader availability. With the foregoing management scheme, the despreader and buffer storage resources are both advantageously utilized, effectively as one large data buffer. The buffer 104 may still need to force out data sectors to prevent overflow but only when the buffer 104 is in violation of the threshold buffer availability in addition to the despreader 102 being in violation of the threshold despreader availability.

Figure 2:
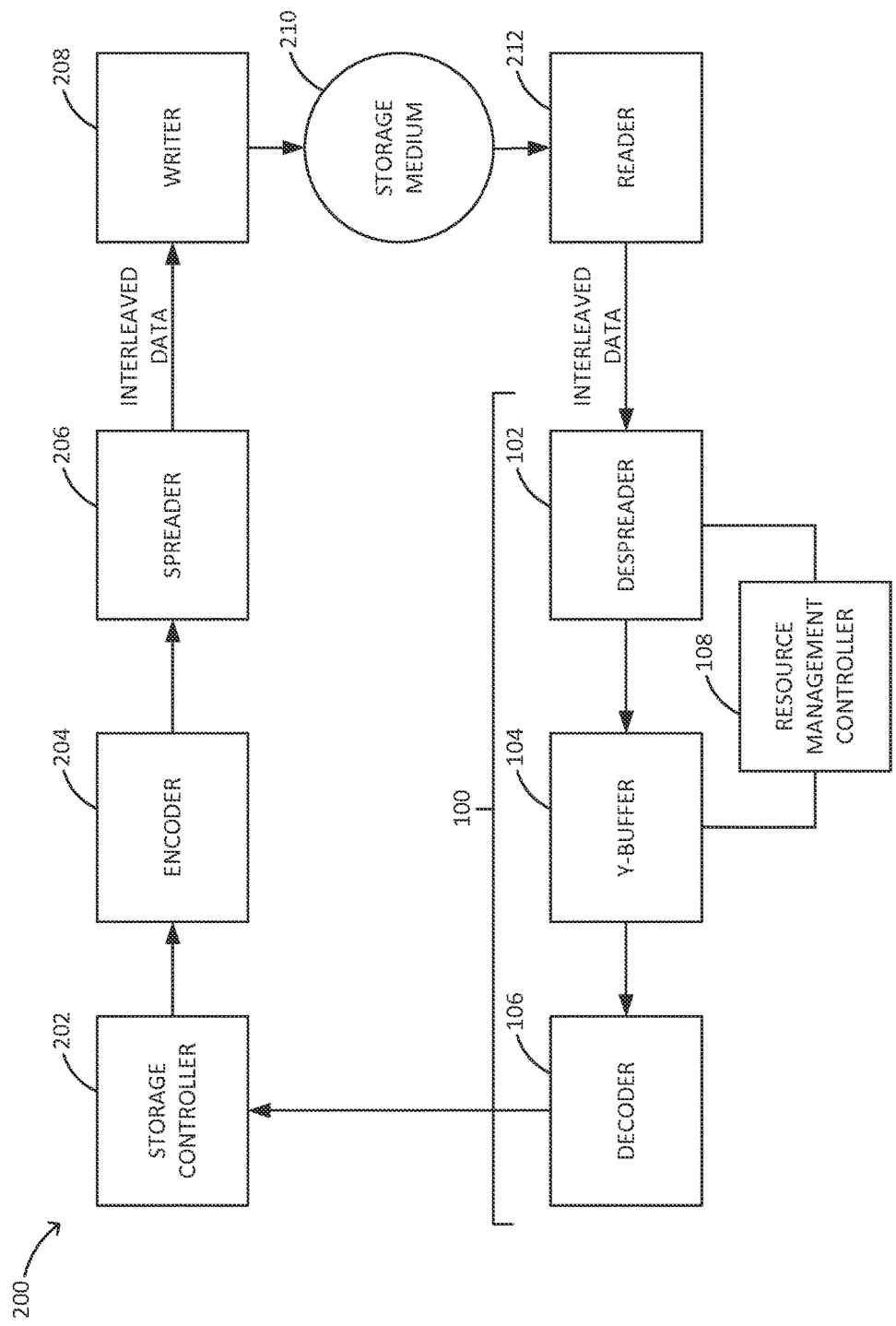
FIG. 2 is a block diagram illustrating a storage device with a read channel including a resource management controller for managing memory resources of a despreader memory block and a Y-buffer, in accordance with an embodiment of the disclosure.

Looking now to FIG. 2, an embodiment is shown where the communication channel 100 defines at least a portion of a read channel of a data storage device 200. A storage controller 202 is configured to store data sectors to a storage medium 210 via a write path including an encoder 204, a spreader 206, and a writer 208. The encoder 204 is configured to encode data sectors transferred from the storage controller 202. The spreader 206 is configured to interleave the encoded data sectors and further configured to transfer the interleaved memory slices of the data sectors to the writer 208 (e.g. a magnetic/optical recording head), which is configured to record the interleaved data on the storage medium 210. When the storage controller 202 retrieves the data from the storage medium 210, a reader 212 (e.g. magnetic/optical read head) is configured to read the interleaved data from the storage medium 210 and further configured to transfer the interleaved data through communication channel 100 (i.e. the read channel), where the incoming data sectors are de-interleaved, decoded, and transferred to the storage controller 202.

Figure 3:
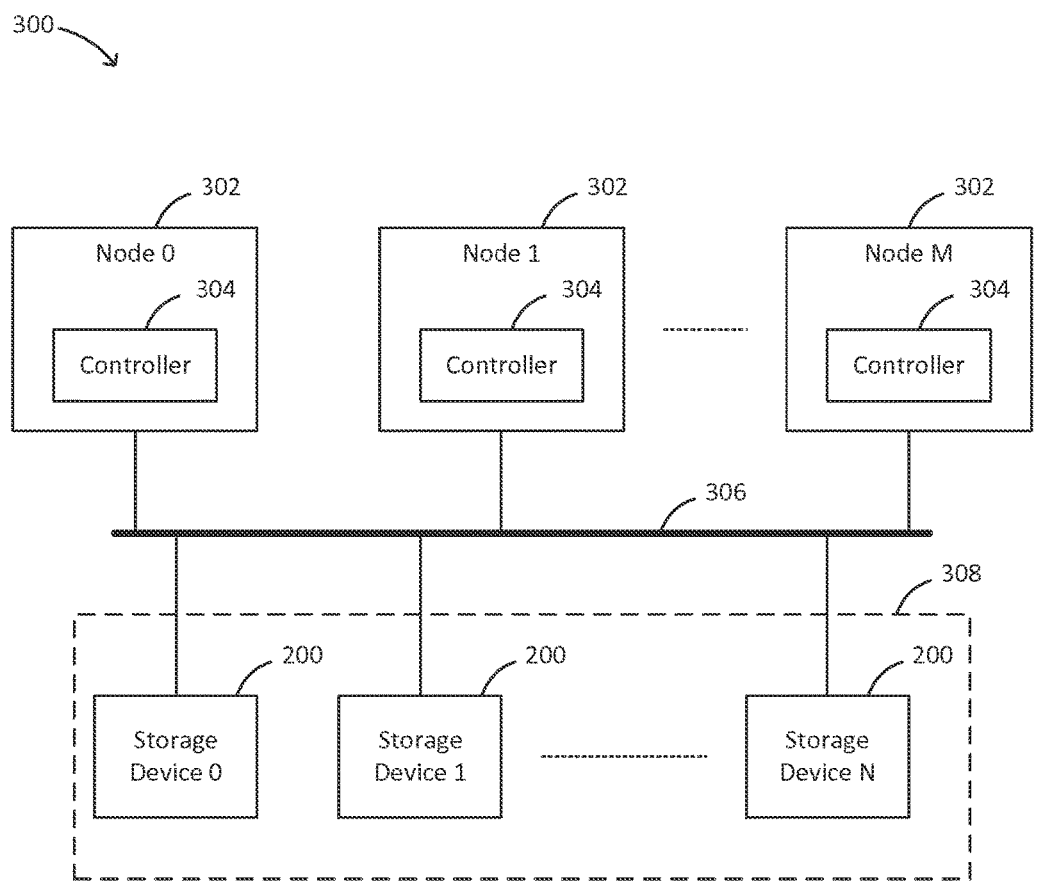
FIG. 3 is a block diagram illustrating a storage system including a cluster of storage devices, in accordance with an embodiment of the disclosure.

Some data storage systems include a plurality of storage devices. For example, redundant array of independent disk or device (RAID) configurations can include N storage devices such as, but not limited to, hard-disk drives, solid-state drives, or a combination thereof, where N is any number greater than 1. FIG. 3 illustrates and embodiment of a data storage system 300 including a RAID configuration where the N devices making up a storage cluster 308 include one or more data storage devices 200 configured for despreader and buffer resource management (as described above). The data storage system 300 further includes one or more nodes 302 or servers, each including a respective controller 304. The controller 304 in each of the one or more nodes 302 may include a RAID-on-Chip (ROC) controller, a processor, or any other controller configured to access some or all of the N devices via a network 306, such as one or more switches or expanders, directly or indirectly linking each controller 304 to the one or more storage devices 200.

Figure 4:
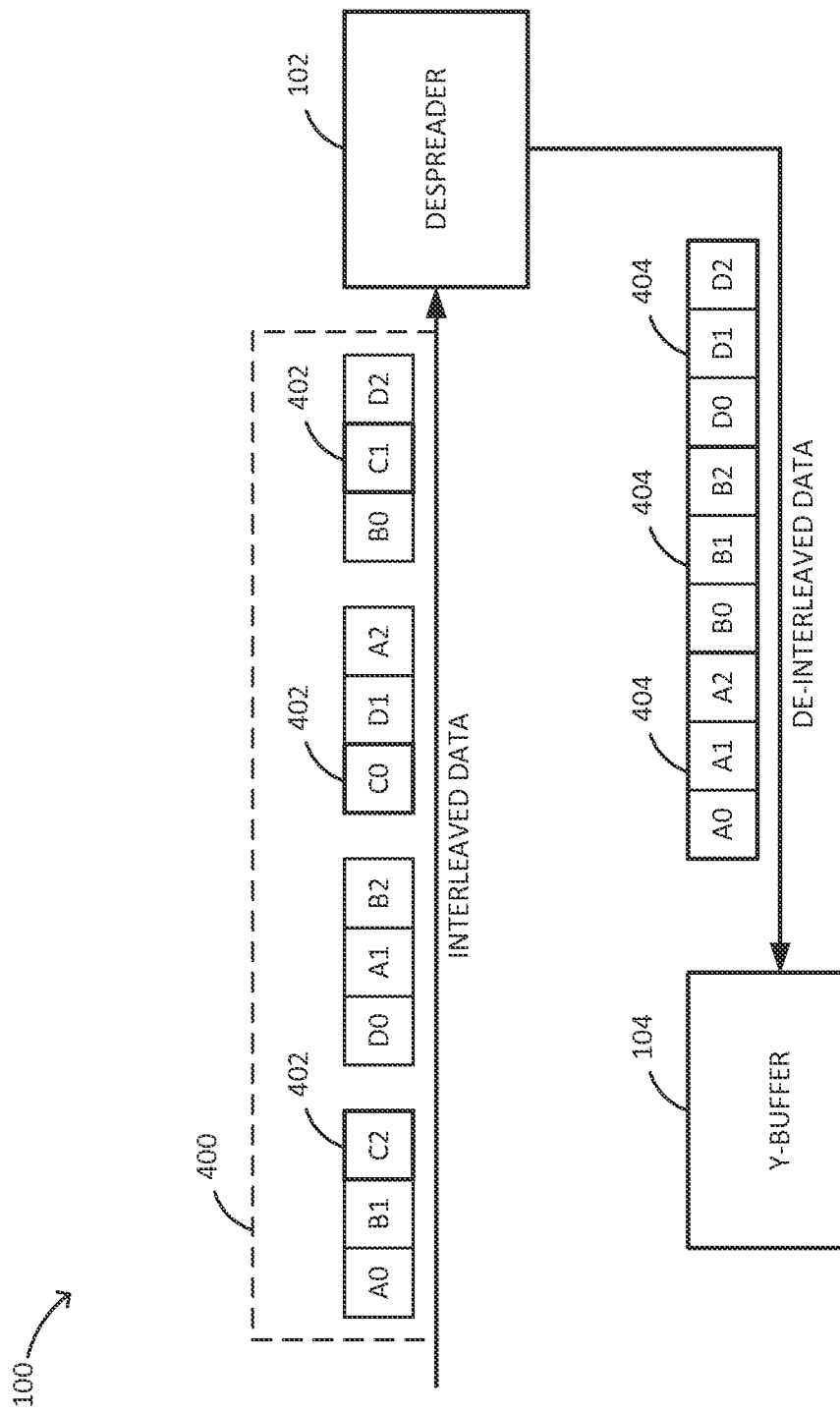
FIG. 4 is a block diagram illustrating data flow into and out of the despreader memory block, in accordance with an embodiment of the disclosure.

FIGS. 4 through 7B further illustrate the operations, functions, or steps performed by the resource management controller 108, in accordance with various embodiments of the communication channel 100 or a higher level system that includes the communication channel 100, such as the data storage device 200 or the data storage system 300 described above. An input data stream with interleaved memory slices 400 being fed into the despreader 102 is shown in FIG. 4. As can be seen, the output data stream may include less information than the input data stream. In some embodiments, memory slices 402 associated with one of the input data sectors may be flagged as non-decoded or non-processed data. Accordingly, the de-interleaved data sectors 404 transferred to the buffer 104 via the output data stream will not include the flagged sector 402. Input and output formatting differences can also result in less output data than input data. These are some reasons that the despreader output can be faster than the input. If the output is uncontrolled, the despreader 102 may output data too quickly resulting in overflow of the buffer 104 or degraded decoder performance because at least one of data sectors queued for sequential output from the buffer 104 is forced into the decoder 106 to prevent overflow, thereby forcing a previously transferred data sector out of the decoder 106 before it has run through a complete decoding cycle.

Figure 5A:
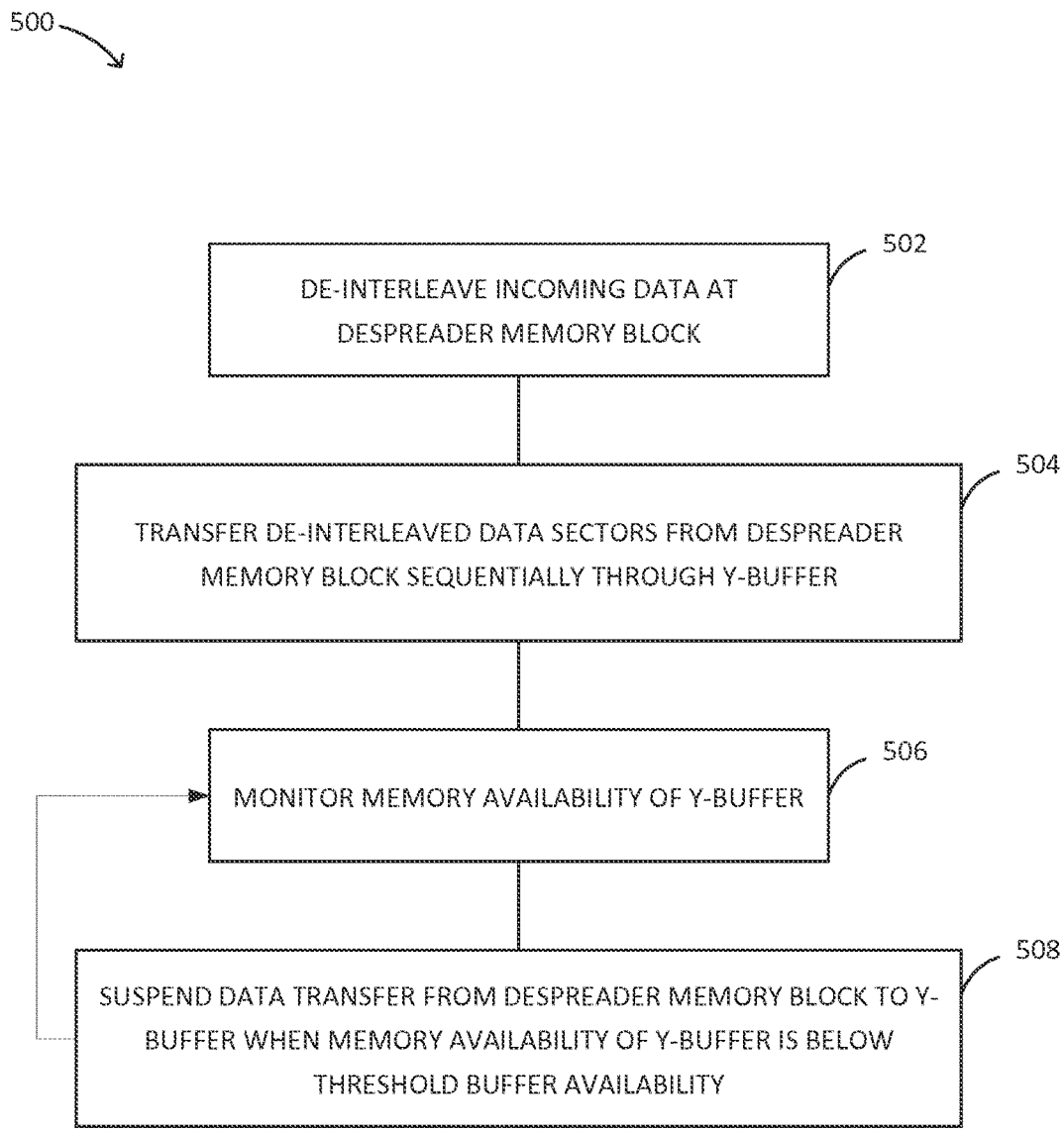
FIG. 5A is a flow diagram illustrating a method of managing memory resources of a despreader memory block and a Y-buffer, in accordance with an embodiment of the disclosure.
Figure 5B:
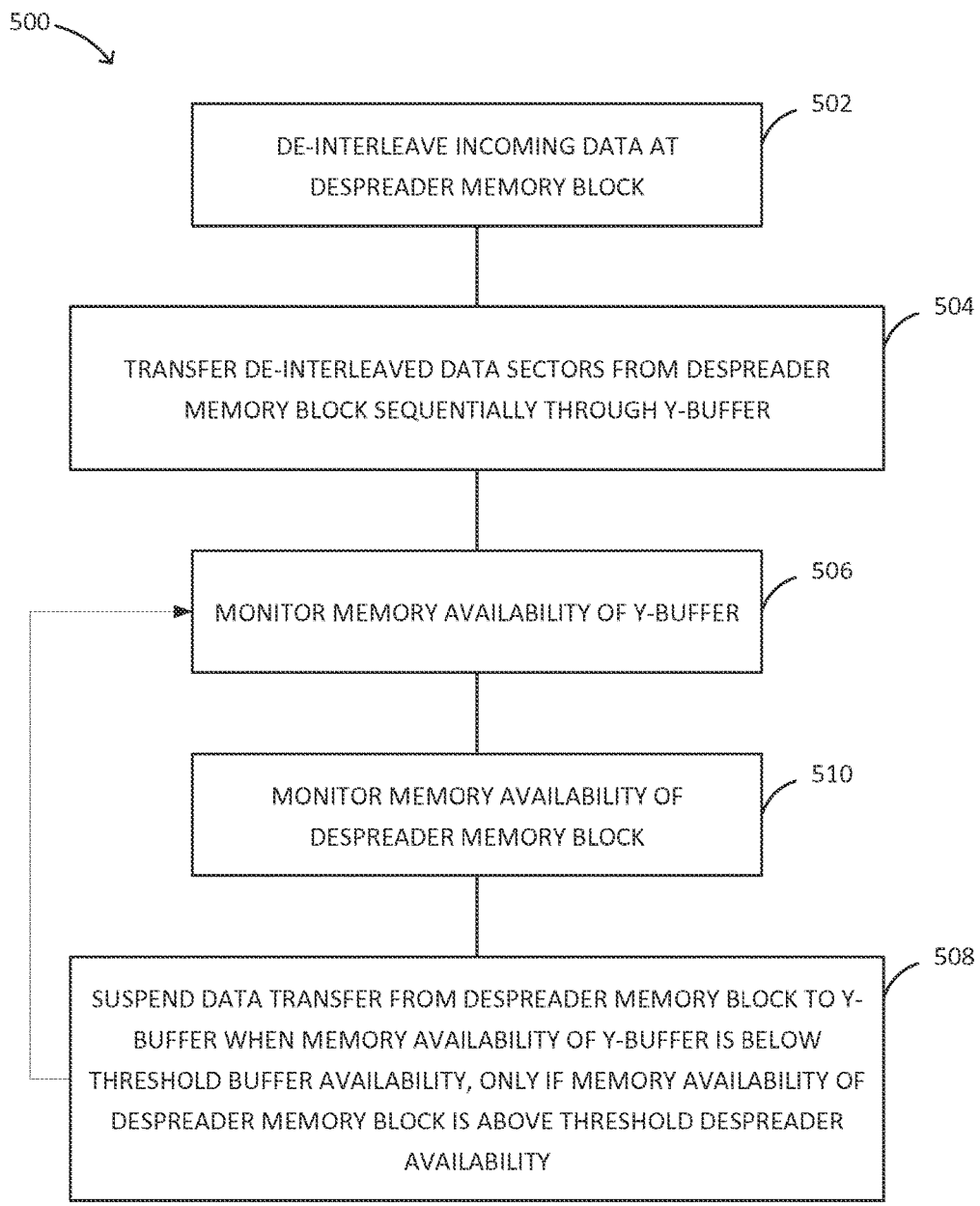
FIG. 5B is a flow diagram illustrating a method of managing memory resources of a despreader memory block and a Y-buffer, in accordance with an embodiment of the disclosure.
Figure 6:
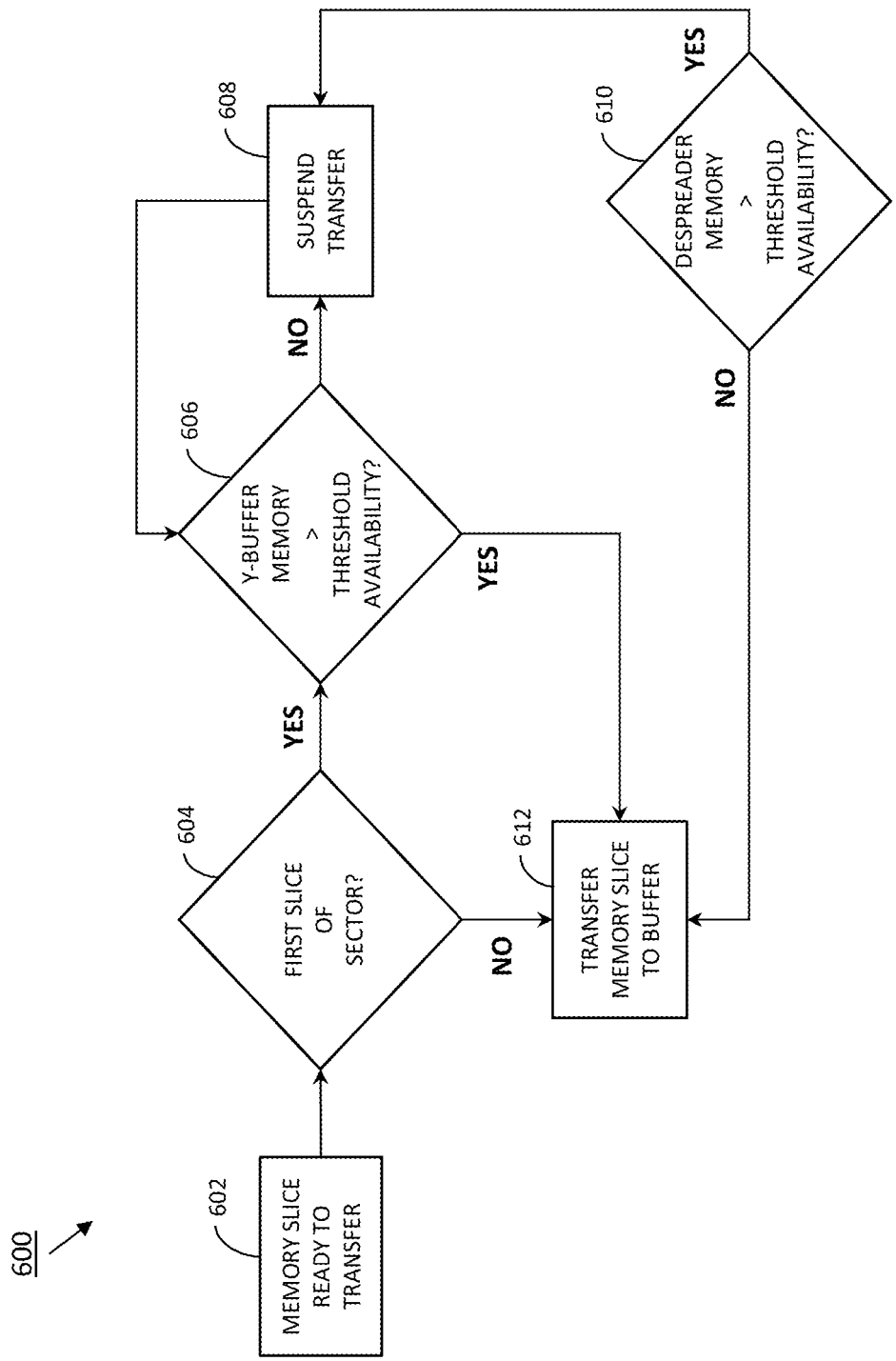
FIG. 6 is a flow diagram illustrating a method of managing memory resources of a despreader memory block and a Y-buffer, in accordance with an embodiment of the disclosure.
Figure 7A:
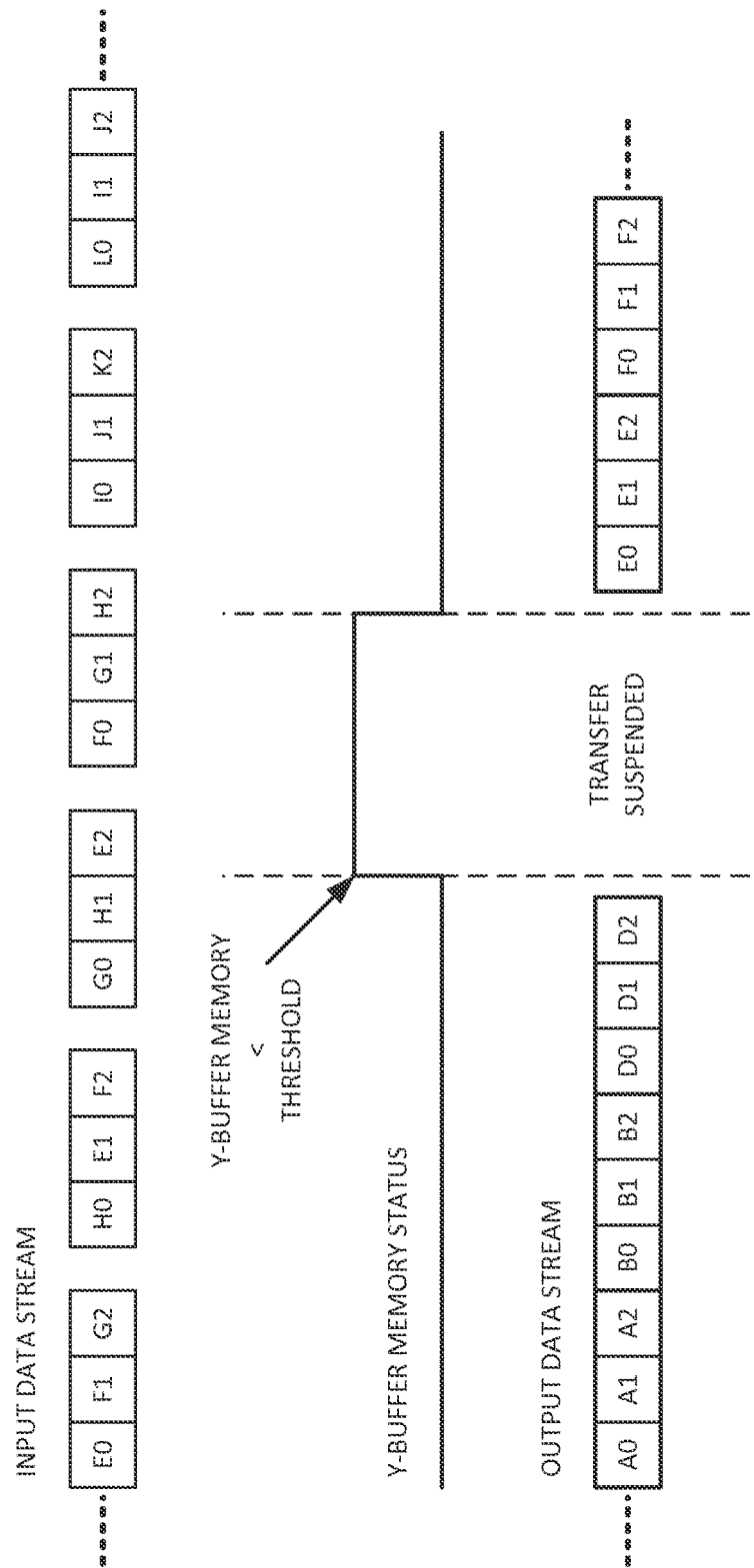
FIG. 7A is a timing diagram illustrating data flow into and out of the despreader memory block, the data flow being managed according memory availability of the Y-buffer, in accordance with an embodiment of the disclosure.
Figure 7B:
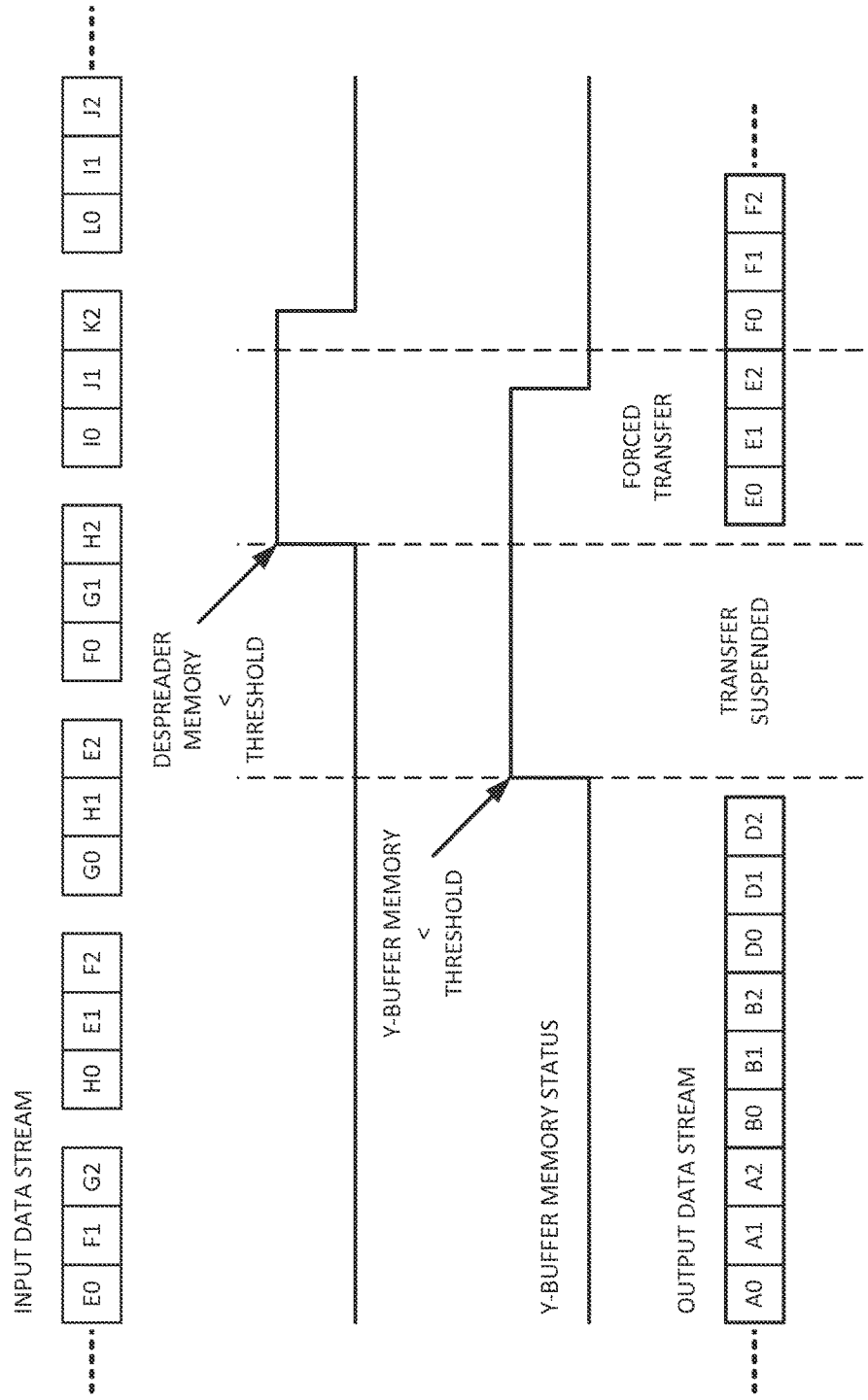
FIG. 7B is a timing diagram illustrating data flow into and out of the despreader memory block, the data flow being managed according memory availability of the Y-buffer and memory availability of the despreader memory block, in accordance with an embodiment of the disclosure.

FIGS. 5A through 6 illustrate method 500 and 600 of managing the despreader 102 and the Y-buffer 104 of the communication channel 100 described above. In some embodiments, computer-readable program instructions implementing the steps of method 500 or method 600 are executed by at least one processor from a communicatively coupled carrier medium or carried out via any other hardware, firmware, or software making up the resource management controller 108. Those skilled in the art will further appreciate that methods 500 and 600 are not restricted to the embodiments of the communication channel 100 described herein and can be executed with any combination of systems and devices configured to carry out the following steps.

Looking now to FIG. 5A, the method 500 includes a step 502 of receiving interleaved memory slices associated with a plurality of data sectors at a despreader memory block 102 where the data is de-interleaved, such that the memory slices of each de-interleaved sector are placed in sequential order (as shown in despreader output data stream of FIG. 4). Under normal operation, the method 500 proceeds to step 504 where the memory slices of each de-interleaved sector are transferred sequentially from the despreader 102 to the buffer 104. The de-interleaved sectors are queued in the buffer 104 and sequentially transferred to the decoder 106 for further processing. During steps 502 and 504, a resource monitoring step 506 is continually or periodically performed, wherein the memory availability of the buffer 104 is compared against a threshold buffer availability. When the memory availability of the buffer 104 is below the threshold buffer availability, the method 500 proceeds to step 508 where the despreader 102 is prevented from transferring the memory slices of at least one de-interleaved data sector to the buffer 104. At step 508, data transfer between the despreader 102 and the buffer 104 is suspended and one or more (ready to transfer) de-interleaved data sectors held in the despreader memory block 102.

In an embodiment of method 500 illustrated in FIG. 5B, the method 500 further includes a resource monitoring step 510, wherein the memory availability of the despreader memory block 102 is continually or periodically compared against a threshold despreader availability. In some embodiments, step 510 is performed only when data transfer between the despreader 102 and the buffer 104 is suspended at step 508. At step 508, the despreader output is suspended until the memory availability of the buffer 104 is no longer in violation of the threshold buffer availability only if the memory availability of the despreader memory block 102 is above the threshold despreader availability. When the memory availability of the despreader memory block 102 is below the threshold despreader availability, the despreader 102 is allowed to transfer de-interleaved data to the buffer 104 regardless of the memory availability of the buffer 104 (i.e. data transfers resume or suspension of data transfers is prevented).

FIG. 6 is a flow chart illustrating a method 600 of managing data flow between the despreader 102 and the buffer 104 on a slice-by-slice basis. At step 602, the memory slices of at least one de-interleaved data sector are ready to be transferred from the despreader 102 to the buffer 104. Before transferring a memory slice, the method 600 includes a step 604 of determining whether or not the memory slice is the first slice of a data sector. At step 604, if it is determined that at least one memory slice of the data sector has already been transferred to the buffer 104, the method 600 proceeds to step 612 and transfers the remaining memory slices of the data sector regardless of the memory availability of the buffer 104 in order to avoid sector discontinuities.

If it is determined that the memory slice is the first slice of the data sector (i.e. no prior memory slices have been transferred), the method 600 proceeds to step 606 and compares the memory availability of the buffer 104 against the threshold buffer availability. If the memory availability of the buffer 104 is above the threshold buffer availability, the method 600 proceeds to step 612 and transfers the memory slices of the data sector. If the memory availability of the buffer 104 is below the threshold buffer availability, the method 600 proceeds to step 608 and suspends the data transfer (i.e. the data sector is held in the despreader memory). While the data transfer between the despreader 102 and the buffer 104 is suspended, the method 600 continues to monitor the memory availability of the buffer 104 (step 606) and additionally proceeds to step 610 where the memory availability of the despreader memory block 102 is compared against the threshold despreader threshold.

The method 600 continues to perform steps 606 through 610 until the memory availability of the buffer 102 is no longer in violation of the threshold buffer availability or the memory availability of the despreader memory block 102 is below the threshold despreader availability. When one of the forgoing conditions occurs, the method proceeds to step 612 and resumes data transfer between the despreader 102 and the buffer 104, as shown in the timing diagrams illustrated in FIGS. 7A and 7B.

It should be recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A communication channel, comprising:
   a despreader memory block configured to de-interleave incoming memory slices associated with a plurality of data sectors;
   a buffer configured to receive the de-interleaved memory slices and further configured to transfer the de-interleaved memory slices of the plurality of data sectors sequentially to a decoder for further processing; and
   a resource management controller configured to monitor a memory availability of the despreader memory block and a memory availability of the buffer and further configured to prevent the despreader memory block from transferring the de-interleaved memory slices of a data sector to the buffer when the memory availability of the buffer is below a threshold buffer availability and the memory availability of the despreader memory block is above a threshold despreader availability.

2. The communication channel of claim 1, wherein the resource management controller is further configured to allow the despreader memory block to transfer the de-interleaved memory slices of the data sector to the buffer when the memory availability of the despreader memory block is below the threshold despreader availability, regardless of the memory availability of the buffer.

3. The communication channel of claim 1, wherein the resource management controller is further configured to allow the despreader memory block to transfer a remainder of the de-interleaved memory slices of the data sector to the buffer when at least one memory slice of the data sector has already been transferred to the buffer, regardless of the memory availability of the buffer.

4. The communication channel of claim 3, wherein the resource management controller is further configured to check the memory availability of the buffer before a first memory slice of the data sector is transferred from the despreader memory block to the buffer.

5. The communication channel of claim 4, wherein the resource management controller is further configured to check the memory availability of the despreader memory block before the first memory slice of the data sector is transferred from the despreader memory block to the buffer when the memory availability of the buffer is below the threshold buffer availability.

6. The communication channel of claim 5, wherein the resource management controller is further configured to allow the despreader memory block to transfer the first memory slice of the data sector to the buffer when the memory availability of the buffer is no longer below the threshold buffer availability or when the memory availability of the despreader memory block is below the threshold despreader availability.

7. The communication channel of claim 1, wherein the despreader memory block includes the resource management controller.

8. The communication channel of claim 1, wherein the despreader memory block has a greater storage capacity than the buffer.

9. A storage device, comprising:
   a storage controller;
   a storage medium;
   a write channel in communication with the storage controller, the write channel including a spreader memory block configured to interleave memory slices associated with a plurality of data sectors being transferred from the storage controller to the storage medium; and
   a read channel in communication with the storage controller, the read channel including: a despreader memory block configured to de-interleave memory slices of a plurality of data sectors being retrieved by the storage controller from the storage medium; a buffer configured to receive the de-interleaved memory slices and further configured to transfer the de-interleaved memory slices of the retrieved data sectors sequentially to the storage controller; and a resource management controller configured to monitor a memory availability of the despreader memory block and a memory availability of the buffer and further configured to prevent the despreader memory block from transferring the de-interleaved memory slices of a data sector to the buffer when the memory availability of the buffer is below a threshold buffer availability and the memory availability of the despreader memory block is above a threshold despreader availability.

10. The storage device of claim 9, wherein the resource management controller is further configured to allow the despreader memory block to transfer the de-interleaved memory slices of the data sector to the buffer when the memory availability of the despreader memory block is below the threshold despreader availability, regardless of the memory availability of the buffer.

11. The storage device of claim 9, wherein the resource management controller is further configured to allow the despreader memory block to transfer a remainder of the de-interleaved memory slices of the data sector to the buffer when at least one memory slice of the data sector has already been transferred to the buffer, regardless of the memory availability of the buffer.

12. The storage device of claim 11, wherein the resource management controller is further configured to check the memory availability of the buffer before a first memory slice of the data sector is transferred from the despreader memory block to the buffer.

13. The storage device of claim 12, wherein the resource management controller is further configured to check the memory availability of the despreader memory block before the first memory slice of the data sector is transferred from the despreader memory block to the buffer when the memory availability of the buffer is below the threshold buffer availability.

14. The storage device of claim 13, wherein the resource management controller is further configured to allow the despreader memory block to transfer the first memory slice of the data sector to the buffer when the memory availability of the buffer is no longer below the threshold buffer availability or when the memory availability of the despreader memory block is below the threshold despreader availability.

15. The storage device of claim 9, wherein the storage controller is configured to receive instructions from a redundant array of independent disks (RAID) controller, the RAID controller being in further communication with a plurality of storage devices included with the storage device in a RAID storage cluster.

16. A method of managing memory resources in a communication channel, comprising:
de-interleaving incoming memory slices associated with a plurality of data sectors;
transferring the de-interleaved memory slices of the plurality of data sectors sequentially through a buffer to a decoder;
monitoring a memory availability of the buffer; and
suspending the transfer of the de-interleaved memory slices of a data sector through the buffer when the memory availability of the buffer is below a threshold buffer availability.

17. The method of claim 16, further comprising:
monitoring a memory availability of a despreader memory block; and
transferring the de-interleaved memory slices of the data sector through the buffer when the memory availability of the despreader memory block is below a threshold despreader availability, regardless of the memory availability of the buffer.

18. The method of claim 16, further comprising:
determining when a first memory slice of the data sector has been transferred to the buffer;
transferring a remainder of the de-interleaved memory slices of the data sector to the buffer when the first memory slice of the data sector has already been transferred to the buffer, regardless of the memory availability of the buffer.

19. The method claim 18, further comprising:
checking the memory availability of the buffer before the first memory slice of the data sector is transferred to the buffer.

20. The method of claim 19, further comprising:
checking the memory availability of a despreader memory block before the first memory slice of the data sector is transferred to the buffer when the memory availability of the buffer is below the threshold buffer availability; and
transferring the first memory slice of the data sector to the buffer when the memory availability of the buffer is no longer below the threshold buffer availability or when the memory availability of the despreader memory block is below a threshold despreader availability.

* * * * *